(No Model.)
B. C. HICKS.
VELOCIPEDE.
No. 561,710. Patented June 9, 1896.
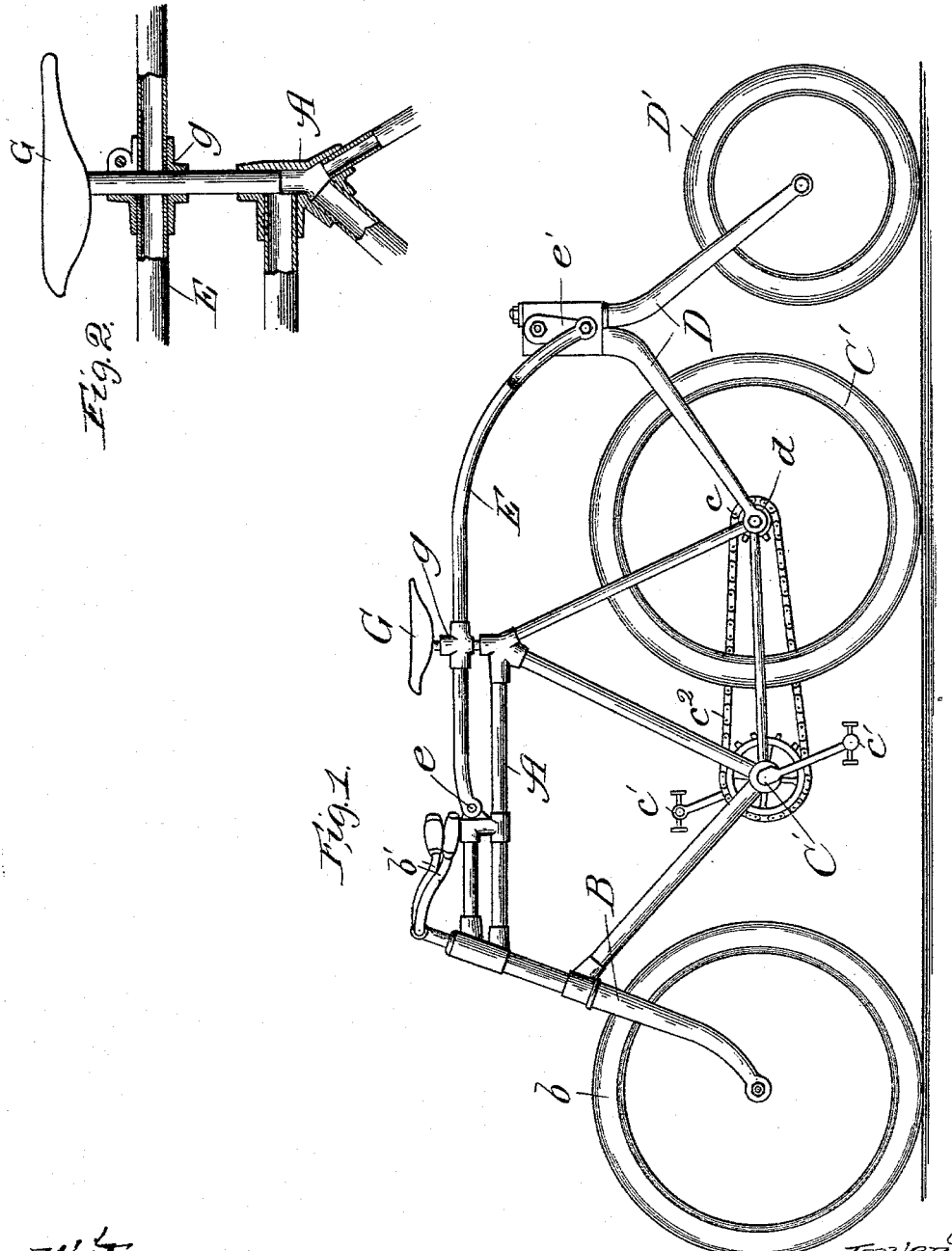
Witnesses:
Inventor:
Bohn C. Hicks.
By Banning & Banning & Sheridan,
Att'ys.

UNITED STATES PATENT OFFICE.

BOHN CHAPIN HICKS, OF CHICAGO, ILLINOIS, ASSIGNOR TO THE REX CYCLE COMPANY, OF SAME PLACE.

VELOCIPEDE.

SPECIFICATION forming part of Letters Patent No. 561,710, dated June 9, 1896.

Application filed February 11, 1896. Serial No. 578,855. (No model.)

*To all whom it may concern:*

Be it known that I, BOHN CHAPIN HICKS, a citizen of the United States, residing at Chicago, Cook county, Illinois, have invented certain new and useful Improvements in Velocipedes, of which the following is a specification.

The object of my invention is to provide a simple, economical, and efficient velocipede particularly adapted to absorb and minimize the shocks incident to riding the vehicle over obstructions; and the invention consists in the features, combinations, and details of construction hereinafter described and claimed.

In the accompanying drawings, Figure 1 is a side elevation of a velocipede fitted with my improvements; and Fig. 2, an enlarged elevation, partly in section, showing a portion of the main and auxiliary frames and mechanism for supporting the saddle or seat in position.

In the use of vehicles, especially velocipedes and safety-bicycles, it is well known that in riding over obstructions a shock is imparted to the rider and vehicle, and which is likely, when repeated a number of times, to injure the rider and result in the destruction of the vehicle or some of the various parts. My invention, therefore, is designed to overcome these objections by providing a velocipede that will permit of riding over ordinary obstructions with the least amount of shock or vertical movement to the rider.

In constructing my improvements I provide a main frame A, of the desired size and shape, and which, as shown in Fig. 1 of the drawings, resembles the ordinary "diamond" frame. This frame is provided with the usual fork B, which carries the front steering-wheel $b$ at its lower end and the handle-bars $b'$ at its upper end. To the rear portion of the main frame is rotatably mounted the driving-wheel C, to which, by means of the sprocket-wheels $c$ $c'$ and sprocket-chain $c^2$, motion and power are transmitted from the crank-axle $C'$.

To minimize the shock when riding over obstructions, I provide an auxiliary frame D, the front arm of which is pivotally connected at $d$ to the main frame adjacent to the axle of the driving-wheel, and the rear arm of which is provided with a supplemental wheel D', arranged to "track" with the driving-wheel. This auxiliary frame is secured to the main frame by means of a connecting rod or bar E, which is pivotally connected to the main frame in front of the driving-wheel at $e$, and its rear portion pivotally connected with auxiliary frame by means of links $e'$. The saddle G is secured to this connecting-rod at $g$, almost directly above the crank-axle, so that the shock or movements of the main frame have very little effect on the rider.

In use it will be seen that when the front wheel strikes an obstruction the front portion of the main frame is lifted, but the pivotal connection of the connecting-rod prevents the saddle from being lifted to any material extent. When the front wheel has passed over the obstruction and the rear wheel strikes the same, such rear wheel is lifted or raised, and, being pivotally connected with the auxiliary frame and connecting-rod, it is permitted to raise without raising the saddle portion any appreciable extent. It will thus be seen that the least amount of lift or shock is imparted to the rider and the machine constructed so as to absorb a large portion of the shock without materially injuring any part thereof. By examining the drawings carefully it will also be seen that these parts (the auxiliary frame and connecting-rod) may be secured to bicycles as now made, thus converting them from a rigid frame into a flexible shock-absorbing frame; or when a machine is made in accordance with my improvement by disconnecting the connecting-rod and auxiliary frame from the main frame the wheel may be used as an ordinary diamond wheel with a rigid frame.

While I have illustrated and described a velocipede composed of a main frame and an auxiliary frame carrying driving and supplemental wheels and mechanisms connecting such frames flexibly, I do not claim this idea broadly in this application, as I consider the same is described and claimed broadly in a pending application, Serial No. 560,654, filed August 27, A. D. 1895.

I claim—

In a vehicle, the combination of a main frame having a front steering-wheel and a rear driving-wheel, pedal-cranks and shaft and means for imparting the motion of the crank-shaft to the driving-wheel, with an auxiliary frame provided with a supplemental wheel arranged substantially in line with the driving-wheel and pivotally connected to the main frame adjacent to the axle of the driving-wheel, a connecting-rod flexibly connecting the auxiliary frame with the main frame in front of the driving-wheel, and a seat portion on such connecting-rod, substantially as described.

BOHN CHAPIN HICKS.

Witnesses:
THOS. F. SHERIDAN,
THOS. B. MCGREGOR.